United States Patent
Maruyama et al.

(10) Patent No.: US 11,494,942 B2
(45) Date of Patent: Nov. 8, 2022

(54) INFORMATION PROCESSING DEVICE, INFORMATION PROCESSING METHOD, PROGRAM, RECORDING MEDIUM, AND CAMERA SYSTEM

(71) Applicant: PATIC TRUST CO., LTD., Kofu (JP)

(72) Inventors: Tetsuo Maruyama, Kofu (JP); Yoshikazu Kato, Kofu (JP)

(73) Assignee: PATIC TRUST CO., LTD., Kofu (JP)

( * ) Notice: Subject to any disclaimer, the term of this patent is extended or adjusted under 35 U.S.C. 154(b) by 0 days.

(21) Appl. No.: 17/607,732

(22) PCT Filed: Nov. 10, 2020

(86) PCT No.: PCT/JP2020/041954
§ 371 (c)(1),
(2) Date: Oct. 29, 2021

(87) PCT Pub. No.: WO2021/095732
PCT Pub. Date: May 20, 2021

(65) Prior Publication Data
US 2022/0207774 A1 Jun. 30, 2022

(30) Foreign Application Priority Data
Nov. 15, 2019 (JP) .............................. JP2019-207468

(51) Int. Cl.
*G06T 7/80* (2017.01)
*G06V 10/77* (2022.01)
*G06V 10/12* (2022.01)

(52) U.S. Cl.
CPC ................ *G06T 7/80* (2017.01); *G06V 10/12* (2022.01); *G06V 10/7715* (2022.01); *G06V 2201/07* (2022.01)

(58) Field of Classification Search
CPC ...... G06T 7/80; G06V 10/12; G06V 10/7715; G06V 2201/07
See application file for complete search history.

(56) References Cited

U.S. PATENT DOCUMENTS 9,082,099 B1 * 7/2015 Kolchin ............... G06Q 10/083
9,454,665 B1 * 9/2016 Wren ...................... G06F 21/60
(Continued)

FOREIGN PATENT DOCUMENTS

CA 2706301 * 5/2009
JP 2004166024 * 11/2002
(Continued)

OTHER PUBLICATIONS

Decision to Grant a Patent dated Apr. 14, 2020 in corresponding Japanese application No. 2019-207468; 6 pages.
(Continued)

*Primary Examiner* — Zaihan Jiang
(74) *Attorney, Agent, or Firm* — Maier & Maier, PLLC

(57) ABSTRACT

An information processing device includes: an acquisition unit that acquires feature information of a target depicted in images; a storage unit that stores registration information containing feature information of registered targets; and a distinction unit that distinguishes, on a basis of a result of identification of the feature information acquired by the acquisition unit and the feature information contained in the registration information, one registered target of the registered targets, the one registered target corresponding to the target in the images. The registration information contains zip codes of sites relating to the registered targets. The distinction unit identifies a zip code of a site relating to the target in the images and zip codes contained in registration information with each other, and distinguishes one registered target corresponding to the target in the images using (Continued)

the result of identification of the feature information and using the identification of the zip codes.

6 Claims, 9 Drawing Sheets

(56) References Cited

U.S. PATENT DOCUMENTS

| | | | | |
|---|---|---|---|---|
| 11,216,773 | B1* | 1/2022 | Griggs | G06K 7/1443 |
| 2009/0074543 | A1* | 3/2009 | Berger | B07C 3/00 |
| | | | | 414/806 |
| 2009/0141934 | A1* | 6/2009 | Caillon | G06V 30/424 |
| | | | | 382/102 |
| 2009/0285448 | A1* | 11/2009 | Carpenter | G07D 7/206 |
| | | | | 382/101 |
| 2015/0140526 | A1* | 5/2015 | Marino | G09B 7/00 |
| | | | | 434/353 |
| 2015/0261866 | A1* | 9/2015 | Cerrone | G06F 16/9535 |
| | | | | 707/767 |
| 2016/0019495 | A1* | 1/2016 | Kolchin | G06Q 10/0833 |
| | | | | 705/333 |
| 2016/0235236 | A1* | 8/2016 | Byers | A47G 29/14 |
| 2018/0260777 | A1* | 9/2018 | Judge | G06Q 10/0836 |
| 2019/0340663 | A1* | 11/2019 | Beckham, Jr. | G06Q 30/0613 |

FOREIGN PATENT DOCUMENTS

| | | | |
|---|---|---|---|
| JP | 2003-187229 A | | 7/2003 |
| JP | 2010-016462 A | | 1/2010 |
| JP | 2010-257450 A | | 11/2010 |
| JP | 2013-149034 A | | 8/2013 |
| JP | 2016154300 | * | 2/2015 |
| JP | 2016-154300 A | | 8/2016 |
| JP | 2018-197980 A | | 12/2018 |

OTHER PUBLICATIONS

International Search Report dated Jan. 19, 2021 in corresponding application No. PCT/JP2020/041954; 5 pgs.
English-language translation of the Written Opinion of the International Searching Authority dated Jan. 19, 2021, in corresponding International Application No. PCT/JP2020/041954; 5 pages.

* cited by examiner

INFORMATION PROCESSING DEVICE, INFORMATION PROCESSING METHOD, PROGRAM, RECORDING MEDIUM, AND CAMERA SYSTEM

TECHNICAL FIELD

The present invention relates to an information processing device, an information processing method, a program, a recording medium, and a camera system that execute a procedure of distinguishing targets captured by cameras.

BACKGROUND

Technologies for distinguishing persons captured by cameras by extracting features of the faces of the persons depicted in images taken by the cameras, and by identifying images of the faces of persons who are pre-registered with a database and the extracted features of the faces with each other have been known (refer, for example, to Japanese Patent Application Laid-open No. 2003-187229). In recent years, along with advancement of image recognition technologies using AI (artificial intelligence), it is becoming possible to distinguish humans or objects with high accuracy on the basis of the images taken by the cameras.

SUMMARY

The technologies for automatically distinguishing persons on the basis of, for example, the images of the faces captured by the cameras are applicable, for example, to checking visitors at an entrance of a facility, a process of accepting registered users in counter services, and counting repeat customers in a store. However, if the cameras cannot be freely installed, conditions such as distances between the cameras and targets to be captured, capture directions of the cameras, and an ambient lighting situation may be unsuited for capturing the faces. In such cases, the persons may not be distinguished with sufficient accuracy on the basis of the images of the faces. In addition, also if there are a plurality of persons having similar facial features, it may be difficult to distinguish these persons on the basis of the images of the faces.

The present invention has been made in view of such circumstances, and an object thereof is to provide an information processing device, an information processing method, a program, and a recording medium that enable accuracy in distinguishing targets with use of information that is obtained from images taken by cameras to be suppressed from being degraded due to capture conditions of the cameras or similarities between external appearances of the targets, and to provide a camera system including such an information processing device.

According to a first aspect of the present invention, there is provided an information processing device including:

an acquisition unit that acquires feature information of a feature of a specific target including one or more registered specific targets, the feature information being generated on a basis of images which are taken by one or more cameras that are capable of capturing the specific target and which depict the specific target, the feature being extracted from the images and including features of the one or more registered specific targets;

a storage unit that stores registration information containing the feature information of the features of the one or more registered specific targets; and a distinction unit that distinguishes, on a basis of a result of identification of the feature information acquired by the acquisition unit and the feature information contained in the registration information, one registered specific target of the one or more registered specific targets, the one registered specific target corresponding to the specific target in the images on the basis of which the feature information has been generated, in which the registration information contains registered zip codes that are zip codes of sites relating to the one or more registered specific targets, and in which a zip code of a site relating to the specific target in the images is entered into the distinction unit, and in which the distinction unit
identifies the registered zip codes contained in the registration information and the entered zip code with each other, and
distinguishes the one registered specific target corresponding to the specific target in the images on the basis of the result of the identification of the feature information and on a basis of the identification of the registered zip codes and the entered zip code.

According to a second aspect of the present invention, there is provided an information processing method for causing a computer to process feature information of a feature of a specific target including one or more registered specific targets, the feature information being generated on a basis of images which are taken by one or more cameras that are capable of capturing the specific target and which depict the specific target, the feature being extracted from the images and including features of the one or more registered specific targets, the computer including a storage unit that stores registration information containing the feature information of the features of the one or more registered specific targets, the information processing method including:
an acquisition step of acquiring the feature information; and
a distinction step of distinguishing, on a basis of a result of identification of the feature information acquired in the acquisition step and the feature information contained in the registration information, one registered specific target of the one or more registered specific targets, the one registered specific target corresponding to the specific target in the images on the basis of which the feature information has been generated, in which the registration information contains registered zip codes that are zip codes of sites relating to the one or more registered specific targets, and in which the distinction step includes
entering a zip code of a site relating to the specific target in the images,
identifying the registered zip codes contained in the registration information and the entered zip code with each other, and
distinguishing the one registered specific target corresponding to the specific target in the images on the basis of the result of the identification of the feature information and on a basis of the identification of the registered zip codes and the entered zip code.

According to a third aspect, there is provided a program for causing a computer to process feature information of a feature of a specific target including one or more registered specific targets, the feature information being generated on a basis of images which are taken by one or more cameras that are capable of capturing the specific target and which depict the specific target, the feature being extracted from the images and including features of the one or more registered specific targets, the computer including a storage unit that stores registration information containing the feature information of the features of the one or more registered specific targets, the program causing the computer to carry out:

an acquisition step of acquiring the feature information; and a distinction step of distinguishing, on a basis of a result of identification of the feature information acquired in the acquisition step and the feature information contained in the registration information, one registered specific target of the one or more registered specific targets, the one registered specific target corresponding to the specific target in the images on the basis of which the feature information has been generated, in which the registration information contains registered zip codes that are zip codes of sites relating to the one or more registered specific targets, and in which the distinction step includes entering a zip code of a site relating to the specific target in the images, identifying the registered zip codes contained in the registration information and the entered zip code with each other, and distinguishing the one registered specific target corresponding to the specific target in the images on the basis of the result of the identification of the feature information and on a basis of the identification of the registered zip codes and the entered zip code.

According to a fourth aspect, there is provided a computer-readable recording medium that records a program for causing a computer to process feature information of a feature of a specific target including one or more registered specific targets, the feature information being generated on a basis of images which are taken by one or more cameras that are capable of capturing the specific target and which depict the specific target, the feature being extracted from the images and including features of the one or more registered specific targets, the computer including a storage unit that stores registration information containing the feature information of the features of the one or more registered specific targets, the program causing the computer to carry out:

an acquisition step of acquiring the feature information; and a distinction step of distinguishing, on a basis of a result of identification of the feature information acquired in the acquisition step and the feature information contained in the registration information, one registered specific target of the one or more registered specific targets, the one registered specific target corresponding to the specific target in the images on the basis of which the feature information has been generated, in which the registration information contains registered zip codes that are zip codes of sites relating to the one or more registered specific targets, and in which the distinction step includes entering a zip code of a site relating to the specific target in the images, identifying the registered zip codes contained in the registration information and the entered zip code with each other, and distinguishing the one registered specific target corresponding to the specific target in the images on the basis of the result of the identification of the feature information and on a basis of the identification of the registered zip codes and the entered zip code.

According to a fifth aspect, there is provided a camera system including:

a plurality of cameras; and an information processing device including an acquisition unit that acquires feature information of a feature of a specific target including one or more registered specific targets, the feature information being generated on a basis of images which are taken by one or more cameras that are capable of capturing the specific target and which depict the specific target, the feature being extracted from the images and including features of the one or more registered specific targets, a storage unit that stores registration information containing the feature information of the features of the one or more registered specific targets, and a distinction unit that distinguishes, on a basis of a result of identification of the feature information acquired by the acquisition unit and the feature information contained in the registration information, one registered specific target of the one or more registered specific targets, the one registered specific target corresponding to the specific target in the images on the basis of which the feature information has been generated, in which the registration information contains registered zip codes that are zip codes of sites relating to the one or more registered specific targets, and in which a zip code of a site relating to the specific target in the images is entered into the distinction unit, and in which the distinction unit identifies the registered zip codes contained in the registration information and the entered zip code with each other, and distinguishes the one registered specific target corresponding to the specific target in the images on the basis of the result of the identification of the feature information and on a basis of the identification of the registered zip codes and the entered zip code.

According to a sixth aspect of the present invention, there is provided another information processing device including:

an acquisition unit that acquires feature information of a feature of a specific target including one or more registered specific targets, the feature information being generated on a basis of images which are taken by one or more cameras that are capable of capturing the specific target and which depict the specific target, the feature being extracted from the images and including features of the one or more registered specific targets;

a storage unit that stores registration information containing the feature information of the features of the one or more registered specific targets; and a distinction unit that distinguishes, on a basis of a result of identification of the feature information acquired by the acquisition unit and the feature information contained in the registration information, one registered specific target of the one or more registered specific targets, the one registered specific target corresponding to the specific target in the images on the basis of which the feature information has been generated, in which the storage unit stores camera information containing zip codes of respective sites where the plurality of cameras perform capture.

Advantageous Effects of Invention

The present invention enables the accuracy in distinguishing targets with use of the information that is obtained from the images taken by the cameras to be suppressed from being degraded due to the capture conditions of the cameras or the similarities between the external appearances of the targets.

DETAILED DESCRIPTION OF THE EMBODIMENTS

First Embodiment

Figure 1:
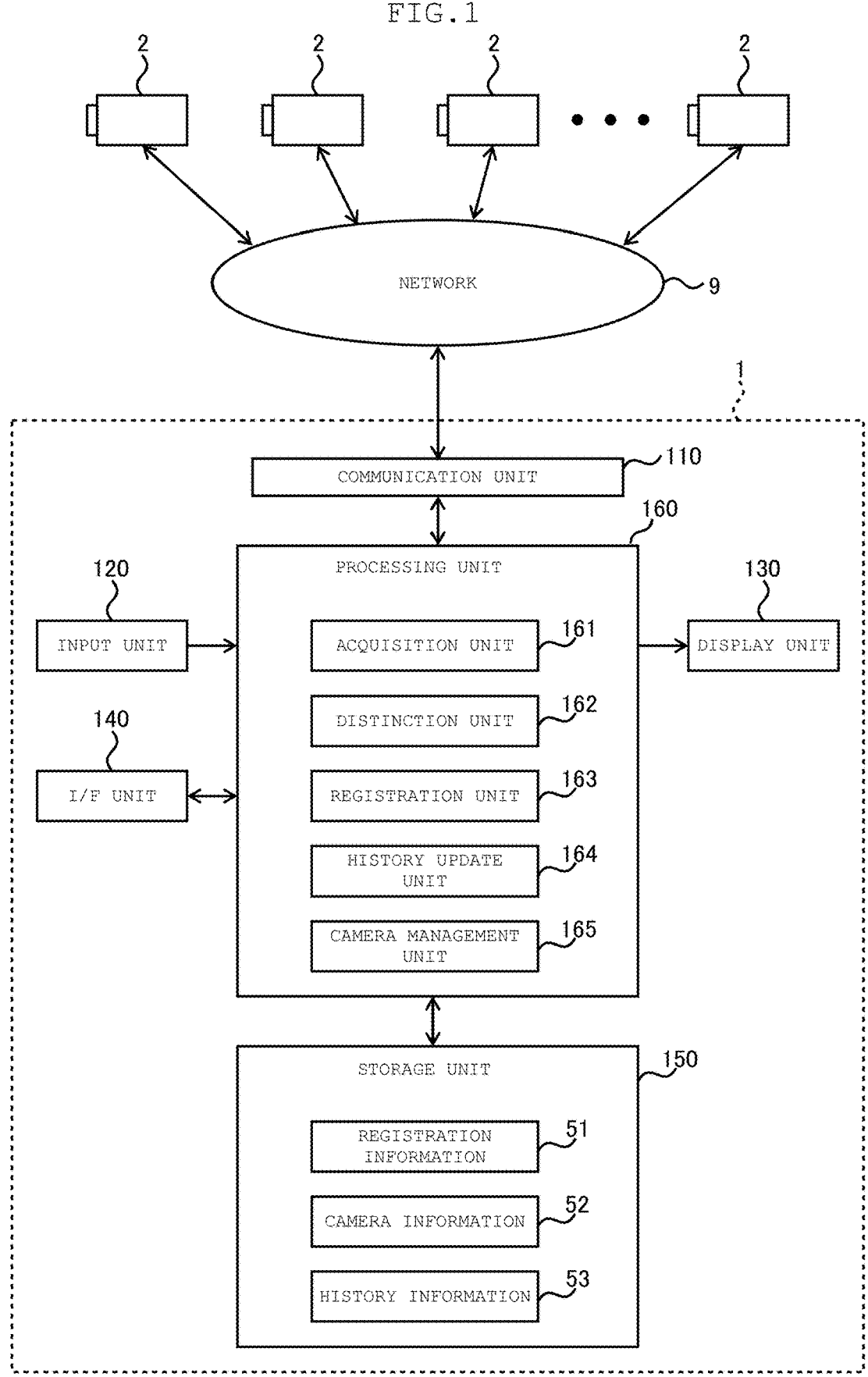
FIG. 1 is a diagram showing an example of a configuration of a camera system according to a first embodiment.

FIG. 1 is a diagram showing an example of a configuration of a camera system according to a first embodiment. The camera system shown in FIG. 1 includes a plurality of cameras 2 and an information processing device 1 that executes processes of distinguishing targets such as humans and objects from each other on the basis of images taken by the cameras 2. The cameras 2 are installed at positions from which a specific target (such as a visitor at a specific site) can be captured, and execute processes of extracting features of the specific target depicted in the taken images (such as features of the face of the visitor). The information processing device 1 identifies information about the features of the target (feature information), which is generated by the cameras 2, and other feature information of pre-registered targets with each other. In this way, the information processing device 1 distinguishes, from other ones of the registered targets, one registered target corresponding to the target captured by the cameras 2. In the example shown in FIG. 1, the plurality of cameras 2 are connected to a network 9 such as the Internet, and the information processing device 1 acquires the information from the cameras 2 via the network 9.

[Information Processing Device 1]

In the example shown in FIG. 1, the information processing device 1 includes a communication unit 110, an input unit 120, a display unit 130, an interface unit 140, a storage unit 150, and a processing unit 160.

The communication unit 110 is a device for communicating with other devices (such as the cameras 2) via the network 9. This communication unit 110 includes devices (such as a network interface card) that perform the communication according to a predetermined communication standard such as Ethernet (trademark) or a wireless LAN.

The input unit 120 is a device for allowing instructions and information to be entered in response to operations by a user. This input unit 20 includes arbitrary input devices such as a keyboard, a mouse, a touchpad, and a touchscreen.

The display unit 130 is a device that displays images of image data to be input from the processing unit 160. Examples of this display unit 130 include a liquid crystal display and an OLED display.

The interface unit 140 is a device for allowing various data to be input to and output from the processing unit 160. This interface unit 140 includes devices with general-purpose interfaces such as USB, and a device that reads and writes recording media (such as a memory card).

The storage unit 150 stores not only programs to be executed by a processor of the processing unit 160, but also, for example, data to be temporarily stored during processes by the processing unit 160, data to be used for the processes by the processing unit 160, and data obtained as a result of the processes by the processing unit 160. For example, the storage unit 150 stores registration information 51 (FIG. 2), camera information 52 (FIG. 3), and history information 53 (FIG. 4) described below.

The storage unit 150 is, for example, a computer-readable recording medium including main storage devices (such as a ROM and a RAM) and an auxiliary storage device (such as a flash memory, a hard disk, or an optical disk). The storage unit 150 may include a single storage device, or may include a plurality of storage devices of one or more types. The storage devices that serve as the storage unit 150 are connected to the processing unit 160 via a bus of a computer or other communication means.

The processing unit 160 comprehensively controls overall operations of the information processing device 1, and executes predetermined information processes. The processing unit 160 includes the one or more processors (such as a CPU and an MPU) that execute the processes in accordance with instruction codes of the one or more programs stored in the storage unit 150. The one or more processors of the processing unit 160 execute the one or more programs in the storage unit 150. In this way, the processing unit 160 runs as one or more computers.

Note that, the processing unit 160 may include one or more dedicated hardware modules configured to implement specific functions (such as ASICs and FPGAs). In this case, the one or more computers as the processing unit 160 may execute the processes relating to the distinction of the target, or the dedicated hardware modules of the processing unit 160 may execute at least some of these processes.

As shown, for example, in FIG. 1, the processing unit 160 includes an acquisition unit 161, a distinction unit 162, a registration unit 163, a history update unit 164, and a camera management unit 165 as components that execute the processes relating to the distinction of the target.

The acquisition unit 161 acquires the feature information of the target, which is generated on the basis of the images taken by the cameras 2 capable of capturing the specific target (such as a human). The feature information is information about the features of the target (such as the features of the face of the person), which are extracted from the images depicting the target (images taken by the cameras 2). In this embodiment, as an example, the feature information is generated by the cameras 2 that capture the target. When the feature information is generated by the cameras 2, the acquisition unit 161 may acquire the feature information directly from the cameras 2, or may acquire the feature information indirectly via one or more server devices (such as cloud servers) connected to the network 9. The feature information to be acquired by the acquisition unit 161 may be the same as the feature information generated by the cameras 2, or may be feature information that is subjected to predetermined conversion, for example, by the server devices interposed between the cameras 2 and the information processing device 1.

The distinction unit 162 identifies the feature information acquired by the acquisition unit 161 (below, sometimes referred to as "acquired feature information") with the feature information contained in the registration information 51 stored in the storage unit 150 (below, sometimes referred to as "registered feature information"). The registered feature information contained in the registration information 51 is feature information that is generated in advance about each of the targets registered with the registration information 51, such as information obtained by extracting the features of the targets from the images of the targets captured in advance. On the basis of results of the identification of the registered feature information and the acquired feature information, the distinction unit 162 distinguishes, from other ones of the targets registered with the registration information 51 (below, sometimes referred to as "registered targets"), one target corresponding to the target depicted in the images from which the acquired feature information has been extracted (images taken by the cameras 2). (Below, the depicted target is sometimes referred to as a "target in the images.")

Figure 2:
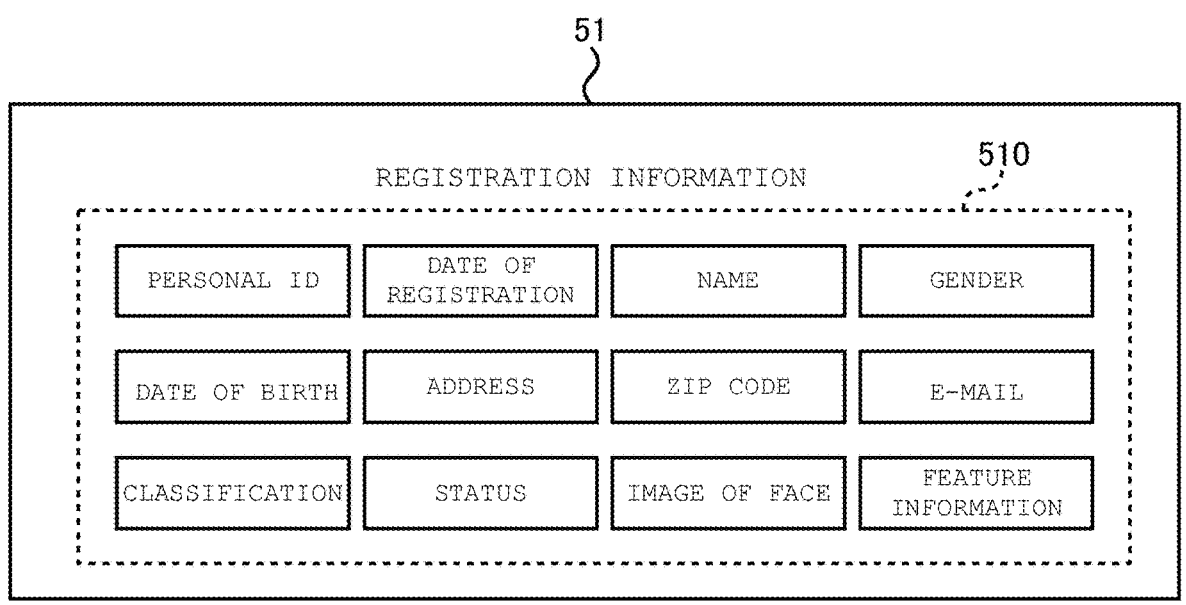
FIG. 2 is a diagram showing an example of registration information.

FIG. 2 is a diagram showing an example of the registration information 51 to be stored in the storage unit 150. The registration information 51 contains predetermined information items about each of the registered targets. In the example shown in FIG. 2, the targets to be registered with the registration information 51 are humans. A reference numeral 510 in FIG. 2 denotes a group of information items to be registered about one of the persons. The group of information items 510 in the example shown in FIG. 2 contains a personal ID for identifying a corresponding one of the persons, a date when the registration is performed (date of registration), his/her personal information items (name, gender, date of birth, address, zip code of the address, and e-mail address), his/her classification (such as a type of membership), a current status (such as whether or not the registration has been valid), data of images of his/her face, and the feature information indicating features of his/her face, the features having been extracted from the images of the face. The registration information 51 contains the group of information items 510 as shown in FIG. 2 about each of the one or more registered persons.

Note that, when the distinction unit 162 executes the processes of distinguishing the registered target corresponding to the target in the images (below, sometimes referred to as a "distinction procedure"), the distinction unit 162 may identify zip codes of sites relating to these targets with each other. Specifically, a zip code of a site relating to the target in the images (such as a zip code of an address of the person depicted in the images taken by the cameras 2) is entered into the distinction unit 162, and the distinction unit 162 identifies this entered zip code and the zip codes contained in the registration information 51 with each other (below, sometimes referred to as "registered zip codes"). In this case, the distinction unit 162 distinguishes the registered target corresponding to the target in the images on the basis of results of the identification of the feature information and results of the identification of the zip codes.

More specifically, if the distinction unit 162 distinguishes two or more candidates of the registered target corresponding to the target in the images as the result of the identification of the feature information (result of the identification of the acquired feature information and the registered feature information), the zip code of the site relating to the target in the images (such as the zip code of the address of the person depicted in the images taken by the cameras 2) is entered into the distinction unit 162 via the input unit 120. Then, the distinction unit 162 identifies registered zip codes of the two or more candidates among the registered zip codes contained in the registration information 51 and the zip code entered via the input unit 120 with each other, and distinguishes, on the basis of a result of this identification, the registered target corresponding to the target in the images from other ones of these two or more candidates. For example, the distinction unit 162 distinguishes, from the other ones of these two or more candidates, one target whose zip code, which is contained in the registration information 51, is the same as the zip code entered via the input unit 120 as the registered target corresponding to the target in the images. In this way, even when the target cannot be distinguished only by the identification of the feature information, the target can be distinguished with high accuracy by using the result of the identification of the zip codes.

The registration unit 163 executes a process of adding information about the target to be registered (such as the group of information items 510 shown in FIG. 2) to the registration information 51 in the storage unit 150. For example, the registration unit 163 causes the display unit 130 to display a registration screen that prompts entry of the information about the target. The registration unit 163 adds the information entered via the input unit 120 in accordance with guidance on this registration screen to the registration information 51. In addition, the information about the target, which is added to the registration information 51 by the registration unit 163, may be provided from other devices that are communicable via the communication unit 110, or may be input from the recording media and the like via the interface unit 140.

The history update unit 164 stores information about a capture history of the registered target corresponding to the target in the images into the storage unit 150 if the distinction unit 162 distinguishes the registered target.

In this embodiment, as an example, the camera information 52 containing respective information items about the cameras 2 and the history information 53 of respective capture histories of the targets registered with the registration information 51 are stored in the storage unit 150. The camera information 52 contains zip codes of respective sites where the cameras 2 perform capture (below, sometimes referred to as "capture-site zip codes"). The history information 53 contains a zip code of a capture site of one camera 2 of the cameras 2, the one camera 2 having captured the target distinguished by the distinction procedure. If the distinction unit 162 distinguishes the registered target corresponding to the target in the images, the history update unit 164 adds, to the history information 53, a capture-site zip code of the one camera 2 that has captured the distinguished target among the capture-site zip codes contained in the camera information 52 as a zip code relating to the capture history of the distinguished target. Since the zip code of the capture site of the one camera 2 is contained as the information about the capture history of the registered target in the history information 53, respective patterns of geographical and temporal movements of the targets (patterns of action if the targets are humans) registered with the registration information 51 can be grasped.

Figure 3:
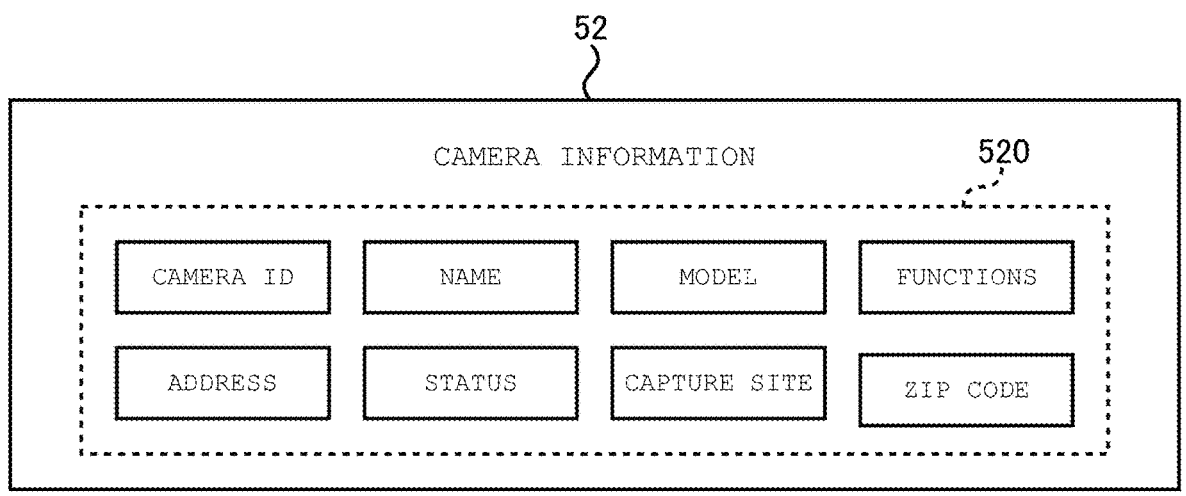
FIG. 3 is a diagram showing an example of camera information.

FIG. 3 is a diagram showing an example of the camera information 52 to be stored in the storage unit 150. A reference numeral 520 in FIG. 3 denotes a group of information items about one of the cameras 2. The group of information items 520 in the example shown in FIG. 3 contains a camera ID for identifying a corresponding one of the cameras 2, a name given to the corresponding one of the cameras 2, a model of this camera 2, functions of this camera 2 (such as a gender determination function, an age determination function, and a facial-expression determination function), an address of this camera 2 on the network (such as an IP address), a current status (such as whether or not in connection to the network 9), an address of a site where capture is performed, a zip code of this address (capture-site zip code). The camera information 52 contains the group of information items 520 as shown in FIG. 3 about each of the one or more cameras 2 of the camera system.

Figure 4:
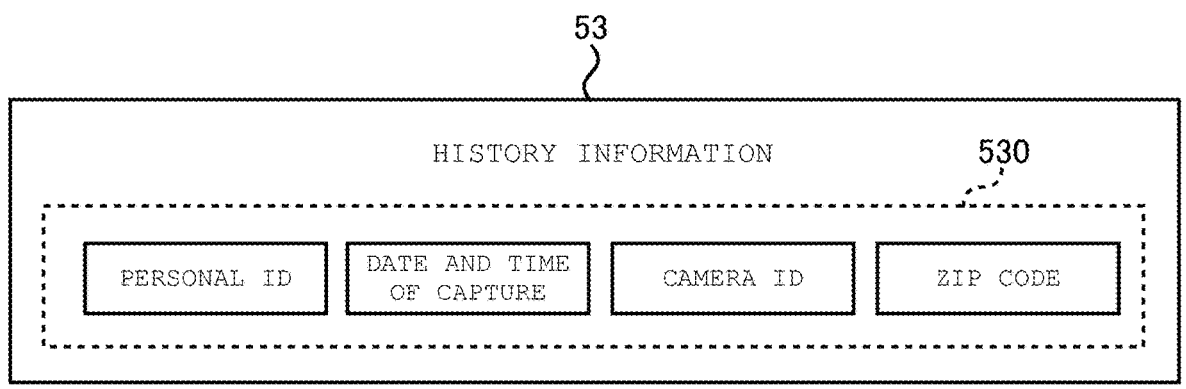
FIG. 4 is a diagram showing an example of history information.

FIG. 4 is a diagram showing an example of the history information 53 to be stored in the storage unit 150. The targets for which the capture histories are recorded as the history information 53 shown in FIG. 4 are humans. (The same applies to the registration information 51 shown in FIG. 2.) A reference numeral 530 in FIG. 4 denotes a group of information items to be recorded if one of the persons is distinguished by the distinction procedure. The group of information items 530 in the example shown in FIG. 4 contains a personal ID of the captured person, a date and time when the capture is performed, a camera ID of the camera 2 that has performed the capture, and the zip code of the address of the site where the capture is performed. The personal ID in the history information 53 is the same as the personal ID in the registration information 51, and the camera ID in the history information 53 is the same as the camera ID in the camera information 52.

Every time the target is distinguished by the distinction procedure, the history update unit 164 generates the group of information items 530 as shown in FIG. 4 about the distinguished target on the basis of the information items contained in the registration information 51 (such as the personal ID), and on the basis of the information items about the camera 2 that has captured the distinguished target (such as the camera ID and the capture-site zip code) among the information items contained in the camera information 52. Then, the history update unit 164 adds this group of information items 530 to the history information 53.

The camera management unit 165 executes processes of managing the cameras 2 of the camera system. For example, when the camera management unit 165 adds a new camera 2 to the camera system, the camera management unit 165 causes the display unit 130 to display a camera addition screen that prompts entry of information about the camera 2 to be newly added. The camera management unit 165 adds the information entered via the input unit 120 in accordance with guidance on this camera addition screen to the camera information 52 shown in FIG. 3.

In addition, when the camera management unit 165 searches for a camera 2 that has satisfied a specific condition, the camera management unit 165 causes the display unit 130 to display a camera search screen that prompts entry of a search condition of the camera 2. When the search condition is entered via the input unit 120 in accordance with guidance on this camera search screen, the camera management unit 165 extracts information about a camera 2 that has satisfied the search condition in the camera information 52 (FIG. 3), and causes the display unit 130 to display the extracted information about the camera 2. For example, if the search condition is a specific zip code, the camera management unit 165 extracts, from the groups of information items about the cameras 2 in the camera information 52, one group of information items containing the capture-site zip code that is the same as this specific zip code, and causes the display unit 130 to display this extracted one group. This enables information about the camera 2 that is installed in a district corresponding to the specific zip code to be easily grasped.

[Camera 2]

Figure 5:
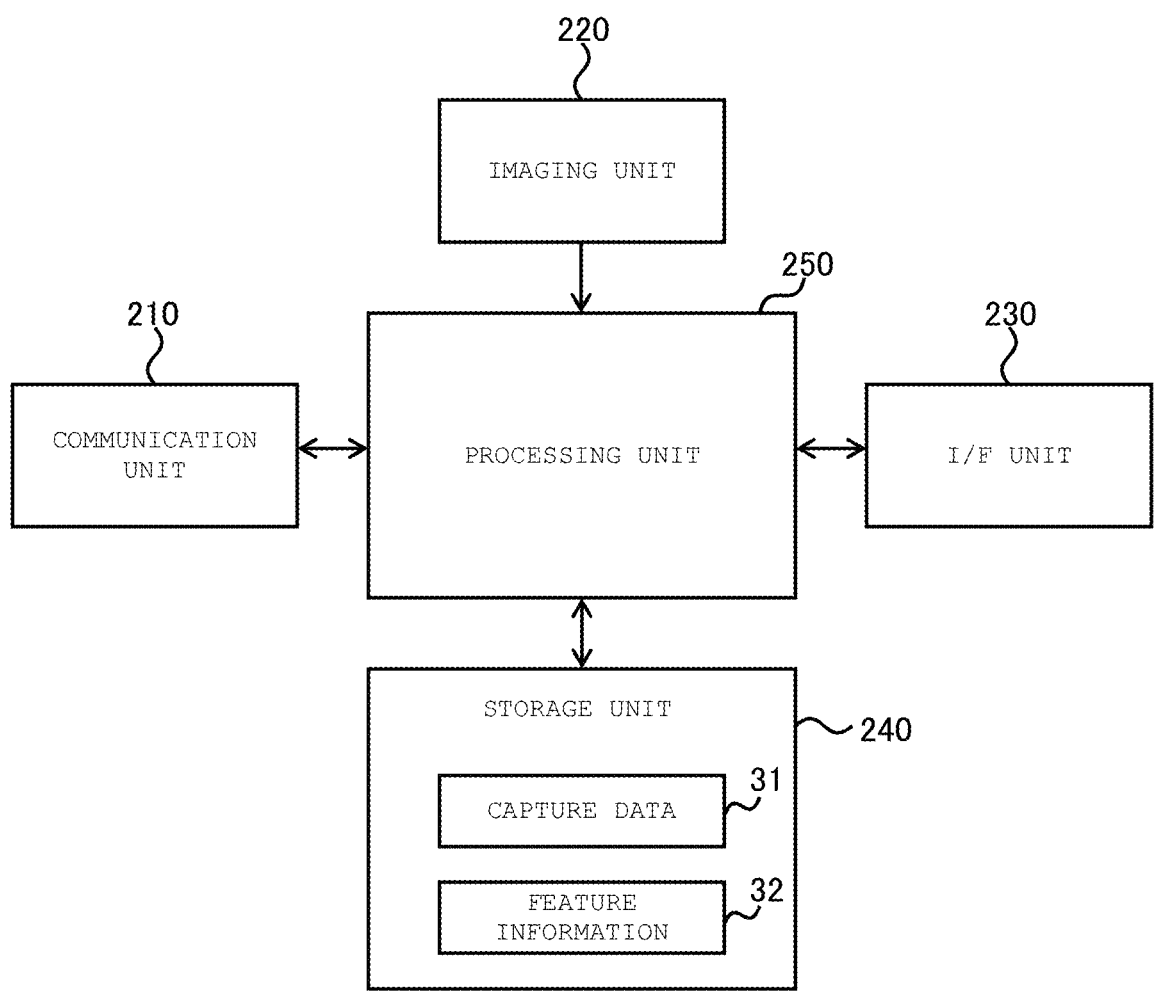
FIG. 5 is a diagram showing an example of a configuration of a camera.

FIG. 5 is a diagram showing an example of a configuration of the camera 2. The camera 2 shown in FIG. 5 includes an imaging unit 220, a communication unit 210, an interface unit 230, a storage unit 240, and a processing unit 250.

The communication unit 210 is a device for communicating with other devices (such as the information processing device 1) via the network 9. This communication unit 210 includes devices (such as the network interface card) that perform the communication according to the predetermined communication standard such as Ethernet (trademark) or the wireless LAN.

The imaging unit 220 is a device that takes images. This imaging unit 220 includes an image sensor such as a CMOS image sensor, an optical system that guides light from a captured target to the image sensor, and an image processing device that processes the images taken by the image sensor.

The interface unit 230 is a device for allowing various data to be input to and output from the processing unit 250. This interface unit 230 includes the devices with the general-purpose interfaces such as the USB, and the device that reads and writes the recording media (such as the memory card).

The storage unit 240 stores not only programs to be executed by a processor of the processing unit 250, but also, for example, data to be temporarily stored during processes by the processing unit 250, data to be used for the processes by the processing unit 250, and data obtained as a result of the processes by the processing unit 250. The storage unit 240 includes the main storage devices (such as the ROM and the RAM) and the auxiliary storage device (such as the flash memory, the hard disk, or the optical disk). The storage unit 240 may include the single storage device, or may include the plurality of storage devices of one or more types.

The processing unit 250 is a device that comprehensively controls overall operations of the camera 2. This processing unit 250 includes the one or more processors (such as the CPU and the MPU) that execute the processes in accordance with instruction codes of the one or more programs stored in the storage unit 240. The one or more processors of the processing unit 250 execute the one or more programs in the storage unit 240. In this way, the processing unit 250 runs as one or more computers. The processing unit 250 may include one or more dedicated hardware modules configured to implement the specific functions (such as the ASICs and the FPGAs). The one or more computers as the processing unit 250 may execute all the processes, or the dedicated hardware modules of the processing unit 250 may execute at least some of these processes.

The processing unit 250 causes the imaging unit 220 to take the images (still images or moving images), and causes the storage unit 240 to store their capture data 31. In addition, the processing unit 250 extracts feature information 32 of features of a specific target depicted in the images taken by the imaging unit 220, and causes the storage unit 240 to store the feature information 32. For example, if the target is a human, and features of his/her face are extracted as the feature information 32, the processing unit 250 generates the feature information 32 on the basis of the features in the images taken by the imaging unit 220, such as features of, for example, his/her eyes, nose, mouth, face, and contour. The feature information 32 may be, for example, multidimensional vectors. In this case, the distinction unit 162 may calculate, on the basis of, for example, a coefficient of a correlation between vectors indicated by the acquired feature information and vectors indicated by the registered feature information, a matching degree of the facial features indicated by these feature information items, and compare the calculated matching degree to a preset threshold. In this way, the distinction unit 162 may determine whether or not the person in the images and the registered persons match each other.

The processing unit 250 communicates with the information processing device 1 via the communication unit 210, and transmits the feature information 32 stored in the storage unit 240 as appropriate to the information processing device 1. The processing unit 250 may transmit, together with the feature information 32 to the information processing device 1, information about a date and time when the images on the basis of which the feature information 32 has been generated are taken.

Now, the operations of the information processing device 1 according to the first embodiment, which has the above-described configuration, are described.

Figure 6:
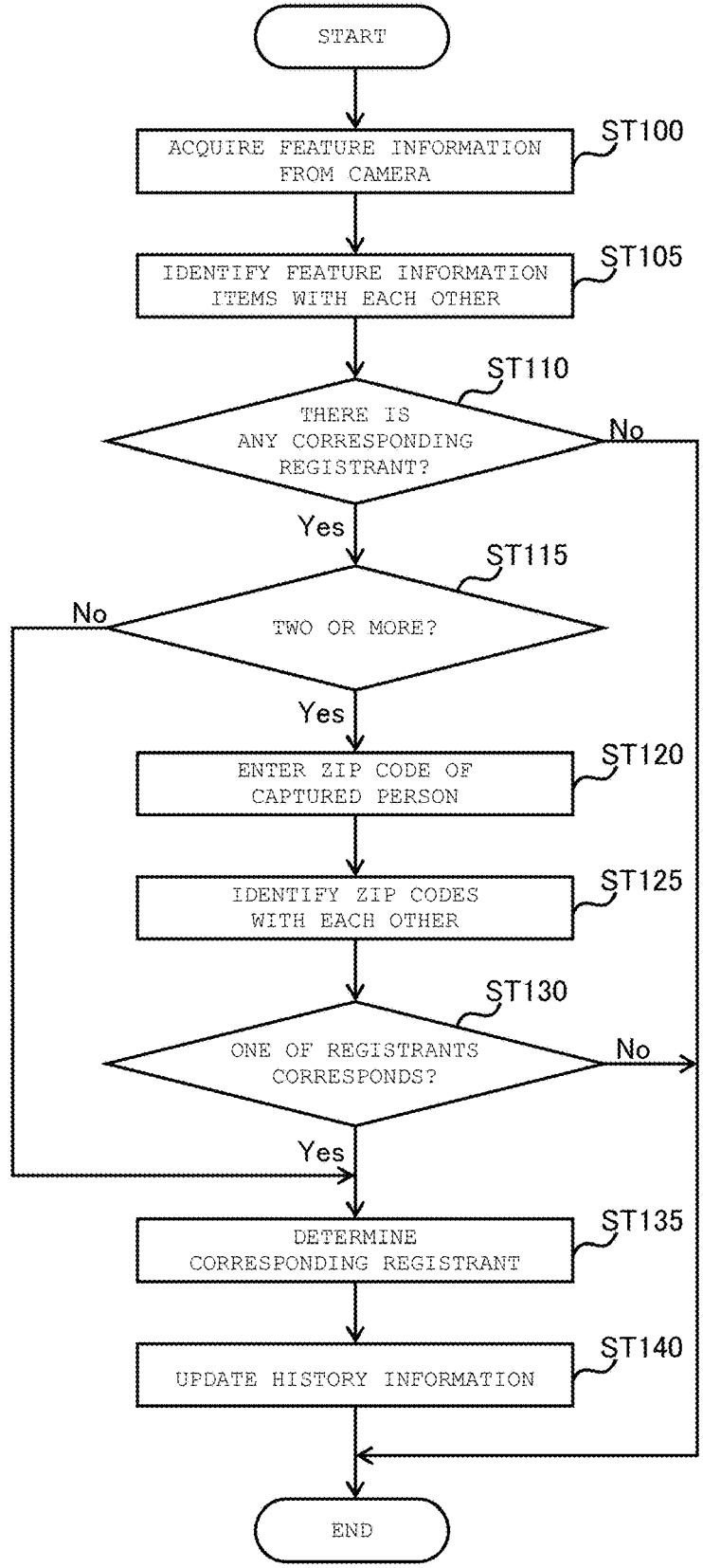
FIG. 6 is an explanatory flowchart showing an example of a procedure in an information processing device according to the first embodiment.

FIG. 6 is an explanatory flowchart showing an example of the procedure in the information processing device 1 according to the first embodiment. Every time the information processing device 1 acquires the feature information from the camera 2, the information processing device 1 executes the procedure shown in the flowchart of FIG. 6. In the example shown in FIG. 6, targets to be distinguished by the information processing device 1 are humans. Below, persons to be registered with the registration information 51 are referred to as "registrants," and a person in the images taken by the camera 2 is referred to as a "captured person."

When the acquisition unit 161 acquires the feature information (acquired feature information) of the captured person from the camera 2 (ST100), the distinction unit 162 identifies the feature information of the registrants (registered feature information), which is contained in the registration information 51, and the acquired feature information of the captured person with each other (ST105). If none of the registrants is found to correspond to the captured person as a result of the identification of the acquired feature information and the registered feature information (No in ST110), the processing unit 160 ends the distinction procedure.

If only one of the registrants is found to correspond to the captured person by the identification in Step ST105 (Yes in ST110 and No in ST115), the distinction unit 162 determines that this one registrant is a result of the distinction of the registrant corresponding to the captured person (ST135). The information processing device 1 uses the result of the distinction in arbitrary processes (such as a process of notifying a predetermined destination address by predetermined notification means such as an e-mail that a particular registrant has been captured by the camera 2).

If the result of the distinction of the registrant corresponding to the captured person has been determined (ST135), the history update unit 164 adds information about the capture history of this registrant to the history information 53 (FIG. 4) (ST140). Specifically, the history update unit 164 generates the group of information items 530 shown in FIG. 4 about the distinguished registrant on the basis of the information contained in the registration information 51 (personal ID), and on the basis of the information items about the camera 2 that has captured the distinguished registrant (such as the camera ID and the capture-site zip code) among the information items contained in the camera information 52. Then, the history update unit 164 adds this group of information items 530 to the history information 53.

If two or more candidates of the registrant corresponding to the captured person are found by the identification in Step ST105 (Yes in ST110 and Yes in ST115), a zip code of an address of the captured person is entered into the distinction unit 162 via the input unit 120 (ST120). For example, if a user who operates the information processing device 1 is a person in charge of services at a counter, and meets the captured person in person at the counter, the user may learn the zip code of the address of the captured person from the captured person himself/herself, and enter the zip code to the information processing device 1 via the input unit 120.

When the zip code is entered via the input unit 120 (ST120), the distinction unit 162 identifies registered zip codes of the two or more candidates among the registered zip codes contained in the registration information 51 (FIG. 2) and the zip code entered via the input unit 120 with each other (ST125). If a result of the identification of the zip code entered via the input unit 120 and the registered zip codes demonstrates that the two or more candidates include only one registrant whose one of the registered zip codes, which are contained in the registration information 51, is the same as the entered zip code (that is, registrant who lives in a district corresponding to the registered zip code that is the same as the entered zip code) (Yes in ST130), the distinction unit 162 determines that the one registrant is the result of the distinction of the registrant corresponding to the captured person (ST135). The history update unit 164 adds the information about the capture history of the determined registrant to the history information 53 (FIG. 4) (ST140). Meanwhile, if the result of the identification of the zip codes in Step ST125 demonstrates that there is no registrant who lives in the district corresponding to the registered zip code that is the same as the zip code entered via the input unit 120, or there are two or more registrants who live in this district (No in ST130), the processing unit 160 ends the distinction procedure.

As described above, according to this embodiment, the registered target corresponding to the target in the images is distinguished on the basis of the result of the identification of the feature information (result of the identification of the acquired feature information and the registered feature information), and on the basis of the result of the identification of the zip codes (result of the identification of the zip code of the site relating to the target in the images and the registered zip codes of the sites relating to the registered targets). For example, if the two or more candidates of the registered target corresponding to the target in the images are distinguished as the result of the identification of the acquired feature information and the registered feature information, the identification of the registered zip codes of the two or more candidates among the registered zip codes contained in the registration information 51 and the zip code entered via the input unit 120 (zip code of the site relating to the target in the images) is made. On the basis of the result of this identification, the registered target corresponding to the target in the images is distinguished from other ones of the two or more candidates. Thus, even if accuracy of the distinction of the target based on the result of the identification of the feature information is degraded due, for example, to capture conditions of the camera 2 or similarity of external appearances of the targets, by using the result of the identification of the zip codes in the distinction procedure, the degradation in accuracy of the distinction can be advantageously suppressed.

Further, according to this embodiment, if the distinction unit 162 distinguishes the registered target corresponding to the target in the images, the capture-site zip code of the camera 2 that has taken the images depicting the distinguished target among the capture-site zip codes contained in the camera information 52 is added to the history information 53 as a zip code relating to the capture history of the distinguished target. Thus, respective patterns of geographical and temporal movements of the targets (patterns of action if the targets are humans) registered with the registration information 51 can be advantageously grasped.

Still further, according to this embodiment, since the zip codes of the sites where the cameras 2 perform capture are contained in the camera information 52 (FIG. 3), the cameras 2 are easily managed respectively in districts corresponding to the zip codes. For example, settings of the cameras 2 can be easily made respectively in the districts. In particular, by using the zip codes, which are used almost all over the world, for managing the cameras 2 respectively in the districts, even if the cameras 2 are installed in countries around the world, the cameras 2 can be easily managed respectively in the districts in the countries.

Yet further, according to this embodiment, the feature information of the targets, which is generated by each of the cameras 2, is provided to the information processing device 1, and the images of the targets captured by the cameras 2 are kept in the cameras 2. Thus, divulgence of the images of the targets to someone other than the user of the information processing device 1 can be advantageously prevented.

Second Embodiment

Next, the information processing device 1 according to a second embodiment is described. A configuration of the information processing device 1 according to the second embodiment is substantially the same as that of the information processing device 1 according to the first embodiment except some of operations of the processing unit 160. Specifically, if the registered target corresponding to the target in the images cannot be distinguished, the information processing device 1 according to the second embodiment automatically registers the target in these images as a new target. By automatically registering an unspecified person captured by the cameras 2 as a target, results of the distinction of the targets (unspecified persons) captured respectively by the cameras 2 can be utilized, for example, in marketing. Below, the difference from the information processing device 1 according to the first embodiment (specifically, differences of the operations of the distinction unit 162 and the registration unit 163) is mainly described.

Figure 7:
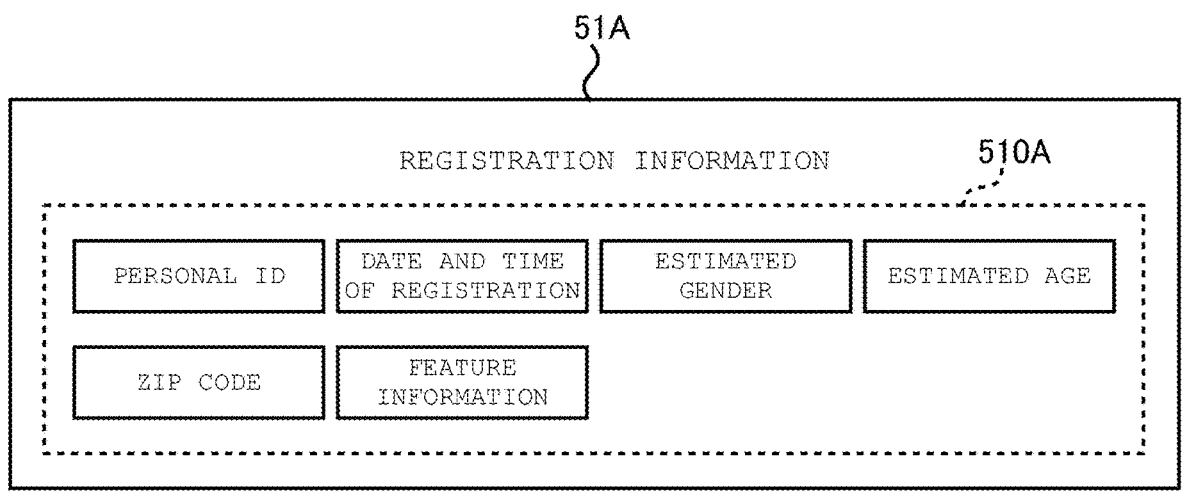
FIG. 7 is a diagram showing an example of registration information to be used in the information processing device according to a second embodiment.

FIG. 7 is a diagram showing an example of registration information 51A to be stored in the storage unit 150 of the information processing device 1 according to the second embodiment. In the example shown in FIG. 7, the targets to be registered with the registration information 51A are humans whose, for example, names are unknown (unspecified persons). A reference symbol 510A in FIG. 7 denotes a group of information items to be registered about one of the persons. The group of information items 510A in the example shown in FIG. 7 contains a personal ID for identifying a corresponding one of the persons, a date when the registration is performed (date of registration), his/her estimated gender, estimated age, a zip code of a site where he/she is captured, and the feature information of the captured person. The registration information 51A contains the group of information items 510A as shown in FIG. 7 about each of the one or more registered persons.

Both the "estimated gender" and the "estimated age" contained in the group of information items 510A (FIG. 7) are estimated by the camera 2. Specifically, on the basis of the images of the person depicted in the images taken by the imaging unit 220 (for example, on the basis of the features of the face in the images), the processing unit 250 of the camera 2 estimates the gender and the age of the person. A result of the estimation of the gender and the age is provided together with the feature information of the person from the camera 2 to the information processing device 1. The acquisition unit 161 of the information processing device 1 acquires, together with the feature information, the result of the estimation of the gender and the age.

If the registered target corresponding to the target in the images cannot be distinguished by the distinction unit 162, the registration unit 163 adds, to the registration information 51A, not only the acquired feature information acquired by the acquisition unit 161 as the feature information of the target to be newly registered, but also a capture-site zip code of the camera 2 that has taken the images depicting the target that cannot be distinguished among the capture-site zip codes contained in the camera information 52. For example, if the registered target (person) corresponding to the target (person) in the images cannot be distinguished by the distinction unit 162, the registration unit 163 generates the group of information items 510A (FIG. 7) containing the "feature information," the "estimated gender," and the "estimated age" acquired by the acquisition unit 161, and adds this group of information items 510A to the registration information 51A.

As in the above-described first embodiment, the distinction unit 162 executes the distinction procedure on the basis of the result of the identification of the feature information (result of the identification of the acquired feature information and the registered feature information), and on the basis of the result of the identification of the zip codes (result of the identification of the zip code of the site relating to the target in the images and the registered zip codes of the sites relating to the registered targets). Note that, when the zip code of the site relating to the target in the images is entered, the zip code is not entered into the distinction unit 162 of the second embodiment via the input unit 120 as in the first embodiment, and a capture-site zip code of the camera 2 that has generated the feature information (zip code of the site where the camera 2 performs capture) among the capture-site zip codes contained in the camera information 52 is input to the same. This saves the user from having to enter the zip code by operating the input unit 120, and enables automatic entry of the zip code of the site relating to the captured target from the camera information 52.

More specifically, if the distinction unit 162 distinguishes two or more candidates of the registered target corresponding to the target in the images as the result of the identification of the feature information, the distinction unit 162 identifies zip codes of the two or more candidates among the zip codes contained in the registration information 51A (registered zip codes), and a zip code of the camera 2 that has generated the feature information (capture-site zip code) among the zip codes contained in the camera information 52 with each other. The distinction unit 162 distinguishes, on the basis of a result of the identification of the registered zip codes and the capture-site zip code, the registered target corresponding to the target in the images from other ones of the two or more candidates. For example, the distinction unit 162 distinguishes, from the other ones of the two or more candidates, one target whose registered zip code, which is contained in the registration information 51A, is the same as the capture-site zip code of the camera 2 that has generated the feature information among the capture-site zip codes contained in the camera information 52 as the registered target corresponding to the target in the images. In this way, even when the target cannot be distinguished by the identification of the feature information, the target can be distinguished with high accuracy by using the result of the identification of the registered zip codes and the capture-site zip code.

In addition, if the result of the identification of the registered zip codes and the capture-site zip code demonstrates that none of the registered zip codes of the two or more candidates among the registered zip codes contained in the registration information 51A matches the capture-site zip code of the camera 2 that has generated the feature information among the capture-site zip codes contained in the camera information 52, the distinction unit 162 additionally identifies zip codes of the two or more candidates among the zip codes contained in the history information 53 (FIG. 4) (below, sometimes referred to as "history zip codes") and the capture-site zip code of the camera 2 that has generated the feature information among the capture-site zip codes contained in the camera information 52 with each other. For example, the distinction unit 162 distinguishes, from the other ones of the two or more candidates, one target whose history zip code, which is contained in the history information 53, is the same as the capture-site zip code of the camera 2 that has generated the feature information among the capture-site zip codes contained in the camera information 52 as the registered target corresponding to the target in the images.

If the target may be captured by the plurality of cameras 2, the camera 2 that captures the target registered with the registration information 51A may be in a site out of a district corresponding to the registered zip code contained in the registration information 51A. In this case, the registered zip code contained in the registration information 51A is different from the capture-site zip code contained in the camera information 52. Thus, the target cannot be correctly distinguished on the basis of a result of identification of these zip codes. However, since the history information 53 contains the history zip codes of the sites where the targets have ever been captured, the history zip codes contained in the history information 53 may match the capture-site zip codes contained in the camera information 52. Thus, even if the target cannot be distinguished on the basis of the result of the identification of the registered zip code contained in the registration information 51A and the capture-site zip code contained in the camera information 52, when a result of the identification of the history zip code contained in the history information 53 and the capture-site zip code contained in the camera information 52 is additionally used in the distinction procedure, the target that may be captured by the plurality of cameras 2 (such as an unspecified person) can be distinguished with high accuracy.

Now, the operations of the information processing device 1 according to the second embodiment, which has the above-described configuration, are described.

Figure 8:
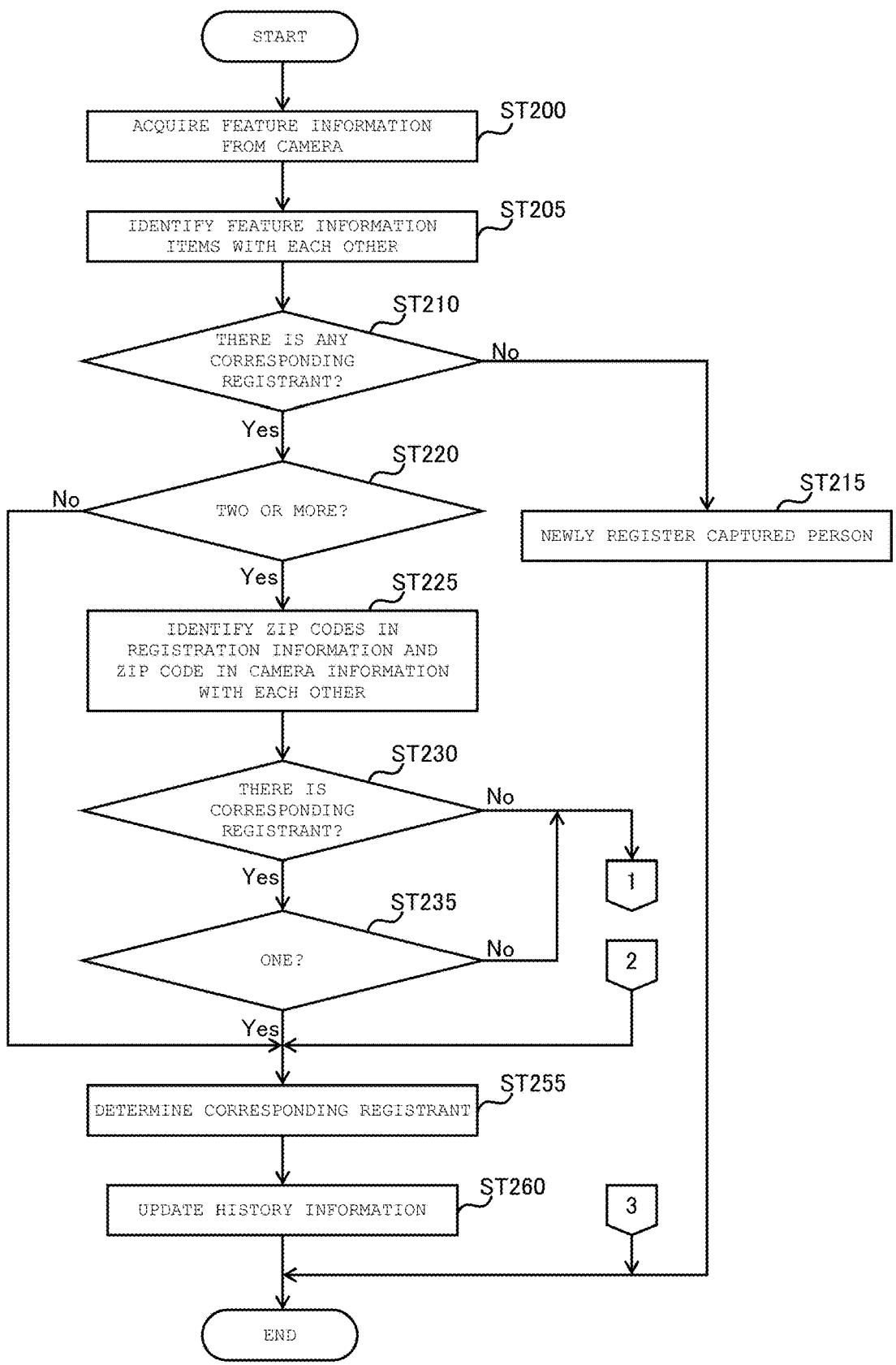
FIG. 8 is a first explanatory flowchart showing another example of the procedure in the information processing device according to the second embodiment.
Figure 9:
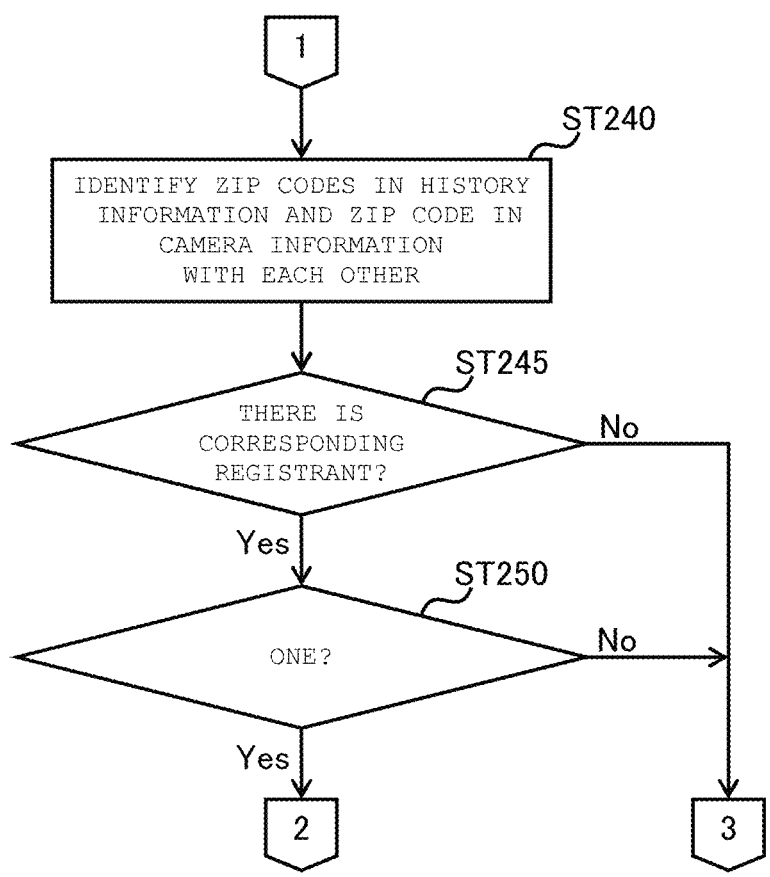
FIG. 9 is a second explanatory flowchart showing the other example of the procedure in the information processing device according to the second embodiment.

FIG. 8 and FIG. 9 are explanatory flowcharts showing another example of the procedure in the information processing device 1 according to the second embodiment. Every time the information processing device 1 acquires the feature information from the camera 2, the information processing device 1 executes the procedure shown in these flowcharts. As in FIG. 6, targets to be distinguished by the information processing device 1 are humans, and persons to be registered with the registration information 51A are referred to as the "registrants," and a person in the images taken by the camera 2 is referred to as the "captured person."

When the acquisition unit 161 acquires the feature information (acquired feature information) of the captured person from the camera 2 (ST200), the distinction unit 162 identifies the feature information of the registrants (registered feature information), which is contained in the registration information 51A, and the acquired feature information of the captured person with each other (ST205).

If a registrant corresponding to the captured person in the images on the basis of which the feature information has been generated cannot be distinguished by the distinction unit 162 as the result of the identification of the acquired feature information and the registered feature information (No in ST210), the registration unit 163 adds, to the registration information 51A, the acquired feature information acquired by the acquisition unit 161 as feature information of the registrant to be newly registered. In addition, the registration unit 163 adds, to the registration information 51A of this registrant to be newly added, a zip code of the camera 2 that has captured the captured person who cannot be distinguished among the zip codes contained in the camera information 52 (ST215). For example, if the registrant corresponding to the captured person in the images cannot be distinguished by the distinction unit 162, the registration unit 163 generates the group of information items 510A (FIG. 7) containing the "feature information," the "estimated gender," and the "estimated age" acquired by the acquisition unit 161, and containing a capture-site zip code of the camera 2 that has captured the captured person who cannot be distinguished among the capture-site zip codes contained in the camera information 52, and adds this group of information items 510A to the registration information 51A.

If only one of the registrants is found to correspond to the captured person by the identification in Step ST205 (Yes in ST210 and No in ST220), the distinction unit 162 determines that this one registrant is a result of the distinction of the registrant corresponding to the captured person (ST255). The information processing device 1 uses the result of the distinction in arbitrary processes.

If the result of the distinction of the registrant corresponding to the captured person has been determined (ST255), the history update unit 164 adds information about the capture history of this registrant to the history information 53 (FIG. 4) (ST260). Specifically, the history update unit 164 generates the group of information items 530 shown in FIG. 4 about the distinguished registrant on the basis of the information (personal ID) contained in the registration information 51A, and on the basis of the information items about the camera 2 that has taken the images depicting the distinguished registrant (such as the camera ID and the capture-site zip code) among the information items contained in the camera information 52. Then, the history update unit 164 adds this group of information items 530 to the history information 53.

If two or more candidates of the registrant corresponding to the captured person are found by the identification in Step ST205 (Yes in ST210 and Yes in ST220), the distinction unit 162 identifies registered zip codes of the two or more candidates among the registered zip codes contained in the registration information 51A and the capture-site zip code of the camera 2 that has generated the feature information among the capture-site zip codes contained in the camera information 52 with each other (ST225). For example, the distinction unit 162 searches the two or more candidates for a registrant whose registered zip code, which is contained in the registration information 51A, is the same as the capture-site zip code.

If a result of the identification of the zip codes in Step ST225 demonstrates that the two or more candidates include only one registrant whose one of the registered zip codes, which is contained in the registration information 51A, is the same as the capture-site zip code (Yes in ST230 and Yes in ST235), the distinction unit 162 determines that the one registrant is the result of the distinction of the registrant corresponding to the captured person (ST255). The history update unit 164 adds the information about the capture history of the determined registrant to the history information 53 (FIG. 4) (ST260).

Meanwhile, if the result of the identification of the zip codes in Step S225 demonstrates that the two or more candidates include two or more registrants whose registered zip codes, which are contained in the registration information 51A, are the same as the capture-site zip code, or that none of the two or more candidates corresponds to the registrant (No in ST230 or No in ST235), the distinction unit 162 identifies history zip codes of the two or more candidates among the history zip codes contained in the history information 53 (FIG. 4) and the capture-site zip code of the camera 2 that has generated the feature information among the capture-site zip codes contained in the camera information 52 with each other (ST240). For example, the distinction unit 162 searches the two or more candidates for a registrant whose history zip code, which is contained in the history information 53, is the same as the capture-site zip code.

If a result of the identification in Step ST240 demonstrates that the two or more candidates include only one registrant whose one of the history zip codes, which is contained in the history information 53, is the same as the capture-site zip code (Yes in ST245 and Yes in ST250), the distinction unit 162 determines that the one registrant is the result of the distinction of the registrant corresponding to the captured person (ST255). The history update unit 164 adds the information about the capture history of the determined registrant to the history information 53 (FIG. 4) (ST260). Meanwhile, if the result of the identification in Step S240 demonstrates that the two or more candidates include the two or more registrants whose history zip codes, which are contained in the history information 53, are the same as the capture-site zip code, or that none of the two or more candidates corresponds to the registrant (No in ST245 or No in ST250), the processing unit 160 ends the distinction procedure without determining the registrant corresponding to the captured person.

As described above, according to this embodiment, if the registered target corresponding to the target in the images cannot be distinguished by the distinction unit 162, the acquired feature information acquired by the acquisition unit 161 is added as the feature information of the target to be newly registered to the registration information 51A. In addition, in this case, the zip code of the camera 2 that has taken the images depicting the target that cannot be distinguished among the zip codes contained in the camera information 52 is added to the registration information 51A. With this, the feature information of the target depicted in the images taken by the camera 2 and the zip code of the site where this target is captured can be automatically registered with the registration information 51A. For example, as the feature information of the unspecified person taken by the camera 2, the feature information of features of his/her face, and the zip code of the site where he/she is captured can be automatically registered with the registration information 51A, and can be utilized, for example, in marketing.

Further, in this embodiment, if the two or more candidates of the registered target corresponding to the target in the images are distinguished as the result of the identification of the feature information, the zip codes of the two or more candidates among the zip codes contained in the registration information 51A, and the capture-site zip code of the camera 2 that has generated the feature information among the capture-site zip codes contained in the camera information 52 are identified with each other. On the basis of the result of this identification, the registered target corresponding to the target in the images is distinguished. By using the result of the identification of the registered zip codes and the capture-site zip code in the distinction procedure in such a way, the degradation in accuracy of the distinction of the target can be advantageously suppressed.

Still further, according to this embodiment, if the result of the identification of the registered zip codes and the capture-site zip code demonstrates that none of the registered zip codes of the two or more candidates matches the capture-site zip code, the history zip codes of the two or more candidates among the history zip codes contained in the history information 53 and the capture-site zip code of the camera 2 that has generated the feature information among the capture-site zip codes contained in the camera information 52 are additionally identified with each other. On the basis of the result of this identification, the registered target corresponding to the target in the images is distinguished. Thus, the target that cannot be distinguished on the basis of the result of the identification of the registered zip codes and the capture-site zip code can be correctly distinguished on the basis of the result of the identification of the history zip codes and the capture-site zip code.

Note that, the present invention is not limited only to the above-described embodiments, and may include other variations.

For example, although the features of the face of the person depicted in the images taken by the camera 2 are extracted as the feature information in the examples of the above-described embodiments, features of arbitrary body parts other than the face may be extracted as the feature information, or features of an entirety of the body may be extracted as the feature information.

Yet further, although humans are distinguished by the distinction procedure in the examples of the above-described embodiments, the targets of the distinction procedure may be creatures other than the humans, or may be objects (non-living things). For example, arbitrary movable bodies such as vehicles may be the targets of the distinction procedure.

Yet further, although the cameras 2 generate the feature information of the targets in the examples of the above-described embodiments, the present invention is not limited to these examples. As other embodiments of the present invention, devices other than the cameras 2 (such as the information processing device 1 and arbitrary server devices that are connected to the network 9) may generate the feature information of the targets on the basis of the images taken by the cameras 2.

The invention claimed is:

1. An information processing device, comprising:
  an acquisition unit that is configured to acquires feature information of a feature of a specific target including one or more registered specific targets, the feature information being generated on a basis of images which are taken by a plurality of cameras that is configured to capture the specific target and depict the specific target, the feature information being extracted from the images and including features of the one or more registered specific targets;

a storage unit that is configured to store:

registration information containing the feature information of the features of the one or more registered specific targets, registered zip codes that are zip codes of sites relating to the one or more registered specific targets, and capture-site zip codes that are zip codes of respective sites where the plurality of cameras is configured to capture the specific target;

a distinction unit that is configured to distinguish, by identifying a match between the registered zip codes and the capture-site zip codes, one registered specific target of the one or more registered specific targets, the one registered specific target corresponding to the specific target in the images on the basis of which the feature information has been generated; and a history update unit that is configured to add, to the history information, a capture-site zip code of a third camera of the plurality of cameras among the capture-site zip codes contained in the camera information as a zip code relating to a capture history of the distinguished one registered specific target after the one registered specific target corresponding to the specific target in the images is distinguished by the distinction unit, the third camera having taken an image that depicts the distinguished one registered specific target among the images.

2. The information processing device of claim 1, further comprising:

a registration unit that is configured to add, feature information acquired by the acquisition unit as the feature information of the specific target to be newly registered and a capture-site zip code of the first camera of the plurality of cameras among the capture-site zip codes contained in the camera information as a registered zip code of a site relating to the specific target to be newly registered among the registered zip codes, the first camera having taken an image that depicts the one registered specific target that cannot be distinguished among the images, and wherein the distinction unit is further configured to:

compare the registered zip code with an entered zip code, distinguish the one registered specific target corresponding to the specific target in the images on the basis of the comparison of the registered zip codes and the entered zip code.

3. The information processing device according to claim 2, wherein, after the distinction unit distinguishes two or more candidates of the one registered specific target corresponding to the specific target in the images as the result of the identification of the feature information, the distinction unit is further configured to:

identify registered zip codes of the two or more candidates among the registered zip codes contained in the registration information and the capture-site zip code of the other one camera that has taken the image on the basis of which the feature information has been generated among the capture-site zip codes contained in the camera information with each other, and distinguish, on a basis of a result of the identification of the registered zip codes and the capture-site zip code, the one registered specific target corresponding to the specific target in the images from other ones of the two or more candidates.

4. The information processing device according to claim 3, wherein the storage unit stores history information of a capture history of the one or more registered specific targets, and wherein the information processing device further includes:

a history update unit that adds, to the history information, a capture-site zip code of a still another one camera of the plurality of cameras among the capture-site zip codes contained in the camera information as a zip code relating to a capture history of the distinguished one registered specific target after the one registered specific target corresponding to the specific target in the images is distinguished by the distinction unit, the still other one camera having taken an image that depicts the distinguished one registered specific target among the images.

5. The information processing device according to claim 4, wherein, after the result of the identification of the registered zip codes and the capture-site zip code demonstrates that none of the registered zip codes of the two or more candidates among the registered zip codes contained in the registration information matches the capture-site zip code of the other one camera that has taken the image on the basis of which the feature information has been generated among the capture-site zip codes contained in the camera information, the distinction unit is further configured to:

identify history zip codes of the two or more candidates among history zip codes that are zip codes contained in the history information and the capture-site zip code of the other one camera that has taken the image on the basis of which the feature information has been generated among the capture-site zip codes contained in the camera information with each other, and distinguish, on a basis of a result of the identification of the history zip codes and the capture-site zip code, the one registered specific target corresponding to the specific target in the images from the other ones of the two or more candidates.

6. An information processing method for causing a computer to process feature information of a feature of a specific target including one or more registered specific targets, the information processing method comprising:

capturing the specific target with a plurality of cameras;

acquiring the feature information of the feature of the specific target based on images taken by the plurality of cameras;

extracting the feature of the specific target based on images taken by the plurality of cameras, wherein the extracted feature includes the one or more registered specific targets;

storing, into a storage unit registration information containing the feature information of the features of the one or more registered specific targets, and registered zip codes that are zip codes of sites relating to the one or more registered specific targets, and capture-site zip codes that are zip codes of respective sites where the plurality of cameras is capturing the specific target;

distinguishing, by identifying a match between the registered zip codes and the capture-site zip codes, one registered specific target of the one or more registered specific targets, the one registered specific target corresponding to the specific target in the images on the basis of which the feature information has been generated; and adding to the registration information, after the one registered specific target corresponding to the specific target in the images cannot be distinguished in the distinction unit, both the feature information and a capture-site zip code of a first camera of the plurality of cameras as a newly registered zip-code, the first camera having taken an image that depicts the one registered specific target that cannot be distinguished among the images.

* * * * *